United States Patent [19]
Zettler et al.

[11] 3,789,662
[45] Feb. 5, 1974

[54] CALORIMETRY

[75] Inventors: John F. Zettler, Ashland; Walter A. Lazar, Needham, both of Mass.

[73] Assignee: Instrumentation Laboratory, Inc., Lexington, Mass.

[22] Filed: Oct. 26, 1971

[21] Appl. No.: 192,111

[52] U.S. Cl. ............................................. 73/190 R
[51] Int. Cl. ........................................... G01k 17/00
[58] Field of Search .......... 73/15, 190; 23/253, 259; 195/103, 127

[56] References Cited
UNITED STATES PATENTS

| | | | |
|---|---|---|---|
| 2,911,824 | 11/1959 | Izerlinsky et al. | 73/190 |
| 2,733,602 | 2/1956 | Jackson, Jr. et al. | 73/190 |
| 3,586,824 | 6/1971 | Barney | 219/435 |
| 3,094,605 | 6/1963 | Welch | 219/20 |
| 3,059,471 | 10/1962 | Calvet | 73/190 |
| 3,417,604 | 12/1968 | Bean et al. | 73/15 |
| 2,951,360 | 9/1960 | Sampson et al. | 73/15 |
| 3,279,239 | 10/1966 | Arends et al. | 73/15 |
| 2,764,015 | 9/1956 | Menoner | 73/15 |

OTHER PUBLICATIONS

Evans et al., "Calorimetry for Biochemical Analysis in Analytical Biochemistry" 11 No. 3Je1965 pg. 449–459.

*Primary Examiner*—Herbert Goldstein
*Attorney, Agent, or Firm*—William M. Ertman

[57] ABSTRACT

Microcalorimetry apparatus that includes structure defining a chamber, thermal insulation enclosing the chamber, and a plurality of sample support structures in the chamber. Each sample support structure includes a thermally insulated receptacle for receiving a sample to be analyzed, a sensor for sensing a sample container disposed therein and providing an output signal indicative thereof, and a temperature sensor disposed for sensing a change in temperature of the sample in the receptacle. One wall of the chamber has a plurality of spaced ports therein, each port being aligned with a corresponding sample support structure and permitting introduction and removal therethrough of a sample from the receptacle of the corresponding sample support structure. The apparatus also includes a plurality of sample container handling structures, each such structure including sealing structure for sealing a port in the wall and coupling structure for detachable connection to a sample container for inserting the sample container through the port for positioning in the receptacle with the sealing structure concurrently sealing the port. Each sample container includes a cylindrical body portion and a radially projecting cylindrical surface above the body portion which actuates the sensor when the container is disposed in the receptacle.

16 Claims, 8 Drawing Figures

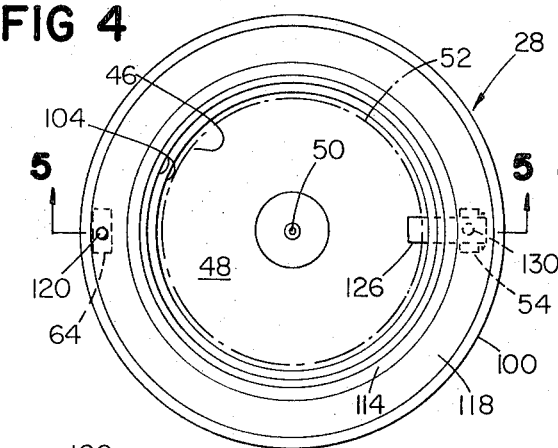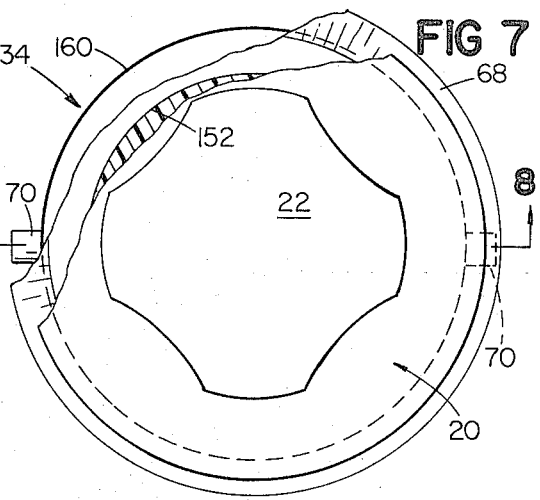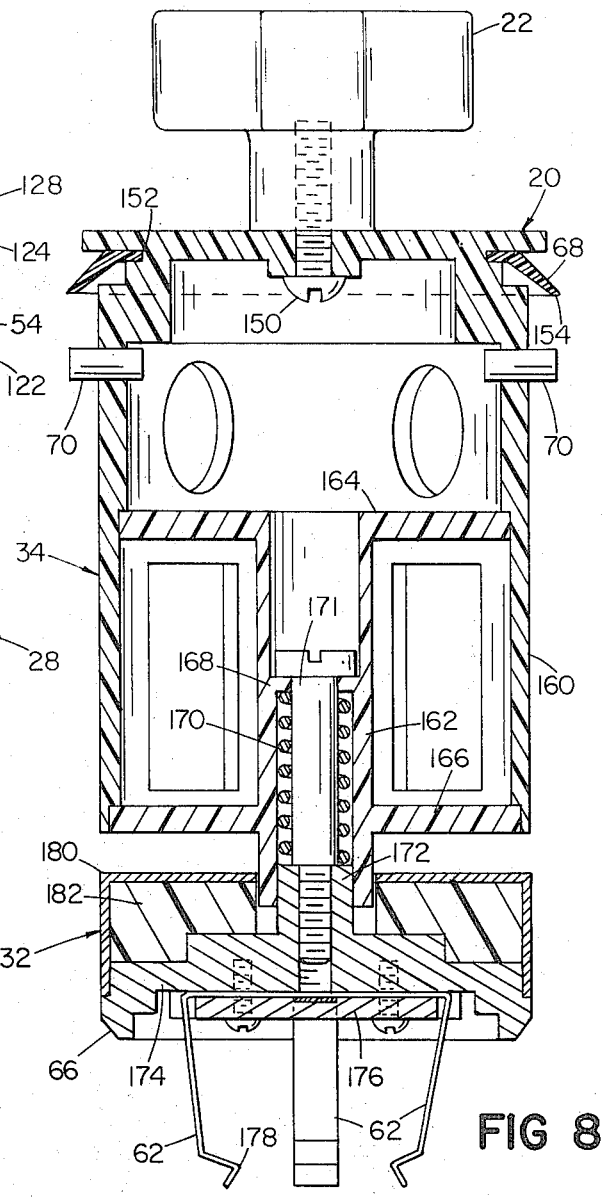

CALORIMETRY

SUMMARY OF INVENTION

This invention relates to calorimetry, and more particularly to microcalorimetry apparatus particularly useful for biochemical analyses.

Calorimetry techniques provide useful information in a variety of areas, a particularly useful area being biochemistry. A particular application involves the detection of bacterial or other microbiological growth by calorimetric techniques. Other systems which produce heat during a period of measurement may coexist with the bacteria in the calorimeter. By sensing the rate of heat production, it is possible to distinguish heat produced by growing microbiological cell populations from heat produced by other systems. Further, a particular type of microbiological cell population may be identified by characteristics of the rate of heat production. It is an object of this invention to provide novel and improved microcalorimetry apparatus of a type useful for such biochemical analyses.

In calorimetry analyses, it is frequently desirable to provide apparatus which permits the concurrent processing of a plurality of samples. Such apparatus should be capable of supervision and operation by personnel without a high degree of technical skill and should be arranged so that samples may be inserted and removed with minimal thermal transients. Also, the system advantageously should facilitate monitoring by automated data processing equipment. Accordingly, another object of the invention is to provide novel and improved microcalorimetry apparatus which accomodates a plurality of samples and facilitates handling of individual ones of such samples by technicians or other relatively unskilled persons.

Another object of the invention is to provide novel and improved microcalorimetry apparatus that facilitates supervision and monitoring of calorimetric output data by automated data processing equipment.

A further object of the invention is to provide novel and improved microcalorimetry apparatus having a quality thermal environment for samples to be analyzed.

Still another object of the invention is to provide a novel and improved sample container for use in microcalorimetry apparatus.

In accordance with a feature of the invention, there is provided microcalorimetry apparatus that includes structure defining a chamber, thermal insulation enclosing the chamber, and a plurality of sample support structures in the chamber. Each sample support structure includes a thermally insulated receptacle for receiving a sample to be analyzed and a temperature sensor disposed for sensing a change in temperature of the sample in the receptacle. One wall of the chamber has a plurality of spaced ports therein, each port being aligned with a corresponding sample support structure and permitting introduction and removal therethrough of a sample from the receptacle of the corresponding sample support structure. The apparatus also includes a plurality of sample container handling structures, each such structure including sealing structure for sealing a port in the wall and coupling structure for detachable connection to a sample container for inserting the sample container through the port for positioning in said receptacle with the sealing structure concurrently sealing the port. In accordance with another feature of the invention, the sample container has a first external wall portion of predetermined dimension conforming to the principal dimension of the receptacle and a second external wall portion that has a radial dimension greater than the radial dimension of the first portion for actuating a sensor in the receptacle when the sample container is inserted in the receptacle.

In a particular embodiment of the invention, at least a portion of the chamber insulation is porous and the system includes means to supply gas along a gas flow path to the chamber to maintain a positive pressure in the chamber sufficient to cause continuous flow of gas through the porous insulation. A thermal coupling member having flexible walls of synthetic plastic material and a hydrocarbon thermal coupling fluid (preferably a heavy mineral oil having a density of about 0.9) is disposed in the receptacle on the heater and the temperature sensor for transmitting heat between the heater and a container in the receptacle and the container and the temperature sensor. Each sample container handling structure includes cover structure for closing said receptacle from which the container coupling structure depends. A second sensor senses the position of the cover structure on the receptacle and provides an output signal indicating that the receptacle is closed. The sealing structure, cover structure and coupling structure are connected so that the container, cover and seal are axially movable relative to one another.

The invention provides apparatus that is particularly useful for the calorimetric analysis of biological samples. Several samples may be analyzed concurrently and independently of one another in separate calorimetric cells and cell status may be monitored remotely. A quality thermal insulation and thermal coupling configuration is provided in a particular embodiment so that accurate heat measurements are obtained. The handling of each sample is facilitated in such embodiment by structure that coordinates sample insertion, cell sealing, and access port sealing. Both sample equilibration and calorimetric monitoring may be controlled remotely.

Other objects, features and advantages of the invention will be seen as the following description of a particular embodiment progresses, in conjunction with the drawings, in which:

FIG. 4 is a top view of a sample receptacle employed in the apparatus shown in FIG. 1;

FIG. 5 is a sectional view of the sample receptacle taken along the line 5—5 of FIG. 4;

FIG. 7 is a top view, with portions broken away, of the sample extractor structure; and FIG. 8 is a sectional view of the sample extractor structure taken along the lines 8—8 of FIG. 7.

DESCRIPTION OF PARTICULAR EMBODIMENT

Figure 1:
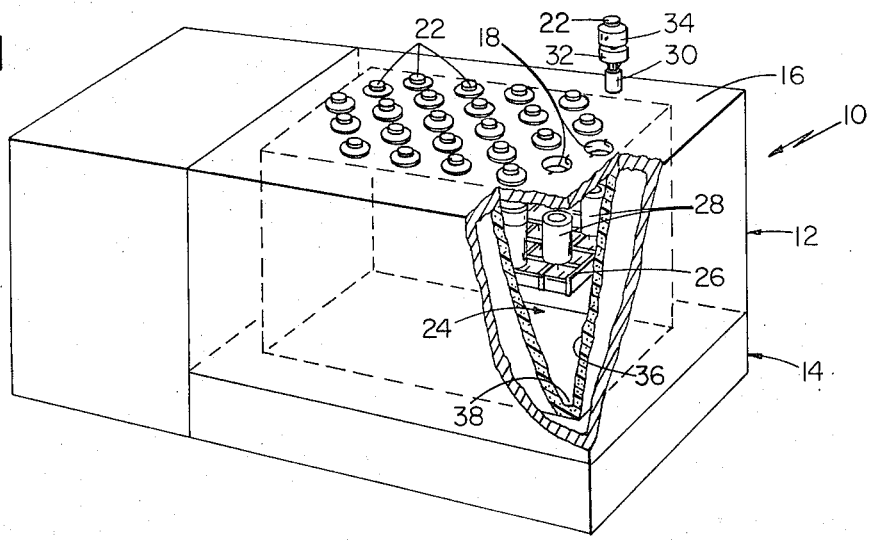
FIG. 1 is a perspective view of the apparatus in accordance with the invention.

The calorimetry apparatus shown in FIG. 1 includes a cabinet body 10 having a calorimeter section 12 and a heater and air supply section 14. The top wall 16 of calorimeter section 12 has a series of ports 18 which are normally closed by seal structures 20, each of which has a projecting handle portion 22. Below the top wall 16 is a calorimeter chamber 24 in which is disposed a support grid 26 on which is disposed a series of calorimeter receptacles 28, each of which is aligned with a corresponding port 18 in top wall 16 and which is adapted to receive a sample container 30 that is coupled to receptacle cap 32 which in turn is connected to coupling structure 34 carried by seal structure 20.

The side walls 36 and bottom wall 38 of chamber 24 are of porous insulation material. Air, heated to an accurately controlled temperature, is continuously flowed into chamber 24 from section 14 so that a continuous flow of heated air at a positive pressure is maintained in chamber 24, the flow being outward from chamber 24 through the porous walls 36, 38 to maintain a stable thermal environment within chamber 24.

Figure 2:
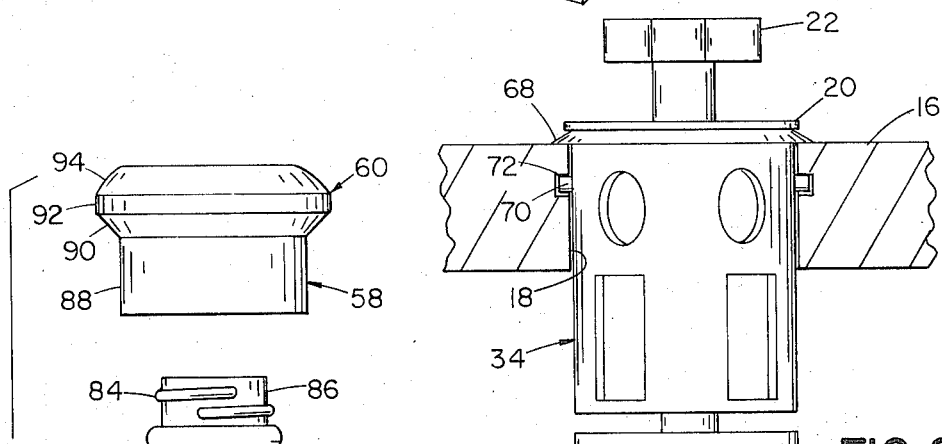
FIG. 2 is a sectional view of a calorimeter cell and sample handling structure employed in the apparatus shown in FIG. 1.

Additional details of the calorimetry apparatus may be seen with reference to FIG. 2. As there indicated, receptacle 28 is mechanically secured to support grid 26 by mechanical coupling members 40. An electrical interface structure 42 is connected to plug structure at the base 44 of the receptacle structure 28. The receptacle defines a chamber 46 for receiving container 30. At the base of chamber 46 is a heater structure 48 and a temperature sensor 50 and a thermal coupling member 52. A sensor 54 in the side wall of recess 46 responds to a projecting surface 56 on container 30 and provides a signal indicating that the sample container is present in chamber 46. Container 30 has cap 58 that has a flange 60 which is engaged by spring fingers 62 which depend from cap 32. In the upper annular wall of receptacle 28 is a second sensor 64 which is actuated by seal surface 66 of cap 32 to provide a second signal when cap 32 is in sealing relation to the body of receptacle 28.

Cap 32 is connected by coupling structure 34 to seal member 20 which includes a resilient annular gasket member 68 that engages the upper surface of top wall 16 to provide a seal. Also carried by coupling structure 34 are radially projecting dowel pins 70 which engage slots 72 in wall 16 to latch the coupling structure in position with seal member flexed to provide a seal on port 18 in top wall 16.

Figure 3:
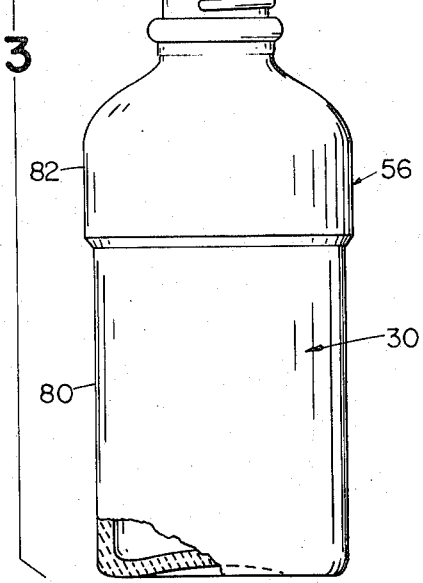
FIG. 3 is a side elevational view of the sample container and cap.

Additional details of sample container 30 and cover 58 may be seen with reference to FIG. 3. The container is made of glass and has a height of 4 and 1/8 inches, a major cylindrical body portion 80 that is one and three-quarter inch in diameter, and an enlarged cylindrical portion 82 that is one and seven-eighths inch in diameter. Threads 84 on the neck 86 of the container engage cooperating threads of the bottle cap 58. Cap 58 has a cylindrical body surface 88 that is one and one-quarter inch in diameter, a lower inclined surface 90 disposed at an angle of 35° to the horizontal, an intermediate vertical surface 92 that has a diameter of one and one-half inches and an upper inclined surface 94 that is disposed at an angle of 60° to the horizontal.

Further details of the container receptacle 28 may be seen with reference to FIGS. 4 and 5. That receptacle includes an aluminum outer casing 100 to which is secured an intermediate layer of polyurethane foam 102 and an inner layer 104 of PVC film. A planar heater element 48 is disposed in the base of chamber 46, and disposed at the center of heater 48 is a bushing 106 through which extends leads 108 that connect thermistor sensor 50 to printed circuit board 110 carried by the housing 44 at the base of receptacle 28. Pluggable electrical connector 112 provides a connection between circuit board 110 and connector structure 42. Leads similar to leads 108 are connected between circuit board 110 and heater 48, switch 54, and switch 64.

At the upper end of receptacle 28 is a seat member 114 that includes an inclined annular lead surface 116 and a recess in which is received a resilient gasket member 118. A magnetic reed switch 64, secured to wall 100 of receptacle 28 has a probe 120 that projects through and above the upper surface of gasket member 118. A second reed switch 54 is secured in recess 122 by cover plate 124 in the side wall of receptacle 28. That switch has a probe element which is engaged by actuator lever 126 that is mounted for pivoting movement on structure 128 and moves probe 130 to actuate switch 54 when the projecting surface 56 of container 30 engages lever 126 as the container 30 is inserted in receptacle 28. The configuration of lever 126 and its cooperation with switch 54 is such that switch 54 is not operated to provide an output signal indicative of the presence of the bottle by engagement with surface 80 but only when projecting surface 82 engages lever 126.

Figure 6:
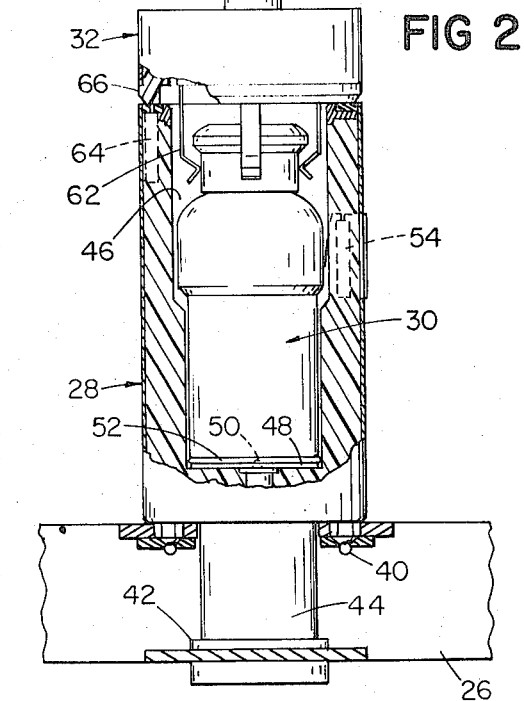
FIG. 6 is a side elevational view, with a portion broken away, of the thermal coupling element employed in the receptacle.

Details of the thermal coupling member 52 are shown in FIG. 6. As there indicated, that structure includes upper and lower layers 134, 136 of flexible silastic material that are sealed at their edges to form an annular junction 138 and filled with a heavy mineral oil 140 to provide a flexible thermal coupling structure which is inserted into chamber 46 and seated over the heater 48 and sensor 50 to provide thermal coupling between those components and the base of container 30 when that container is positioned in chamber 46.

Further details of the container, extractor and seal structure may be seen with reference to FIGS. 7 and 8. As indicated above, that structure includes resilient fingers 62 which engage the rib of container cap 58 and are secured to cover 32 of the receptacle 28. The cover is in turn secured by coupling structure 34 to the cap structure 20 to which the handle 22 is secured by bolt 150. The cover member has an annular recess 152 which receives the inner periphery of seal disc 68. The outer portion of disc 68 is of dished configuration to provide a lip 154 which engages the top surface of the wall 16 surrounding the port 18. Grooves 72 in the walls of port 18 are of L-shaped configuration with a vertical portion and a horizontal portion with a latch recess at the end so that as the dowels 70 are inserted they move downwardly through the vertical portions of the grooves 72 and then the cover assembly is rotated to move the dowels 70 through the horizontal portions into a latching position to seal the port.

The coupling structure 34 includes a cylindrical outer member 160 and a tubular center member 162 that is supported by flanges 164, 166. Flange 168 in tubular member 162 defines an upper seat for spring 170. The head of bolt 171 is seated on the upper surface of flange 168 and is secured to projecting boss 172 of the cap structure 32. The upper surface of boss 172 functions as a lower seat for spring 170. The boss 172 is received within tubular structure 162 of coupling structure 34. Connected to boss 172 is a body structure 174 which defines the seal surface lip 66 of the cap and also provides a surface to which spring fingers 62 are connected by plate 176. Each of the four spring fingers has a latch surface 178. The cap further includes an aluminum shell 180 and foam thermal insulation 182 is positioned in the cap structure betwen shell 180 and body portion 174.

In operation, a sample to be analyzed is inserted in bottle 30 and cap 58 is secured to the bottle. The spring fingers 62 of extractor assembly are then snapped over the lip 60 of the cap, latch surfaces 178 being cammed along surface 94 over surface 92 into latching engagement below surface 90. In this manner the sample container is supported from and may be transported by handle 22 of the extractor assembly. The extractor assembly and supported container 30 are then inserted through a port 18 into the aligned receptacle 28, the lead surface 116 of the receptacle providing initial guiding of the bottle into chamber 46. When the container is seated on coupling 52, switch 54 has been actuated by the engagement of lever 126 with projecting surface 82 to provide a signal via the electronic circuitry face 110 that a container is present in chamber 46.

The extractor assembly is not sealed at this point and continued downward motion allows the latch surfaces 178 of fingers 62 to move away from surface 90 as indicated in FIG. 2 until the seal surfaces 66 engage gasket 118. Contact of seal surface 66 with gasket 118 is signalled by switch 64 through the electrical interface 110 to the monitoring circuitry indicating that the chamber 46 has been thermally sealed.

The port 18 has not yet been sealed, however, and handle 22 is forced down further, compressing spring 170 to impose a bias on the seal between cover 32 and receptacle 28. This operation flexes sealing gasket 68 to provide a seal at the surface of surrounding port 18 and dowel pins 70 are aligned with the horizontal portions of groove 72 so that the cap 20 may be rotated by handle 22 to latch the extractor assembly in the position shown in FIG. 2.

When a sample container has been inserted as above described, it is normally at a temperature below that of the thermal environment in chamber 24. This temperature is sensed by thermistor 50 which provides a signal which causes heater 48 to be energized to raise the temperature in the receptacle chamber 46 to that of the calorimeter chamber 24, a typical temperature being 37° C. After this equilibration period, the calorimeter heater 48 is turned off and a sample analysis sequence is started. In the case of a biological analysis of living bacteria in sterile nutrient media in sample container, the bacteria multiply and produce heat at an increasing rate, which heat is sensed by thermistor 50. This rate of heat production is monitored by associated data processing equipment to provide calorimetric information on the nature of the sample in container 30 in an analysis of the type disclosed in copending U.S. Pat. application Ser. No. 131,675, filed Apr. 6, 1971 and assigned to the same assignee as this application.

It will be seen that the invention provided calorimetry apparatus that facilitates the concurrent analysis of a plurality of samples. Each sample may be inserted into and removed from the analysis chamber in a simple manner by manipulation of an external handle. Signals are provided indicating the presence of a sample container in the calorimeter receptacle and the fact that the calorimeter receptacle is sealed, providing information to supervising equipment as to the status of each calorimeter cell in the apparatus. The apparatus provides excellent insulation geometry which permits efficient heat thermal control of the chamber 46 and accurate calorimetry analysis of samples. The insertion and removal of sample may be easily and rapidly performed by technicians. Further, the receptacle structure is pluggably connected both electrically and mechanically to the support grid so that each receptacle structure may be readily removed and replaced by another similar receptacle structure for maintenance purposes.

While a particular embodiment of the invention has been shown and described, various modifications thereof will be apparent to those skilled in the art, and therefore it is not intended that the invention be limited to the disclosed embodiment or to details thereof and departures may be made therefrom within the spirit and scope of the invention as defined in the claims.

What is claimed is:

1. Microcalorimetry apparatus comprising structure defining a chamber, thermal insulation enclosing said chamber, means to control the temperature of said chamber, a sample support structure in said chamber, said sample support structure including a thermally insulated receptacle for receiving a sample to be analyzed, a cover structure for closing said receptacle, a sample container for disposition in said receptacle, said sample container including a body portion of predetermined dimension and an offset surface portion on said body, a first sensor responsive to said offset surface for providing an output signal indicative of the disposition of said sample container in said receptacle, a second sensor for sensing the position of said cover structure on said receptacle and providing an output signal indicating that said receptacle is closed, heater means and a temperature sensor disposed for sensing a change in temperature of the sample in said receptacle.

2. Microcalorimetry apparatus comprising structure defining a chamber, thermal insulation enclosing said chamber, means to control the temperature of said chamber, a sample support structure in said chamber, said sample support structure including a thermally insulated receptacle for receiving a sample to be analyzed, a cover structure for closing said receptacle, a first sensor for sensing a sample container disposed in said receptacle and providing an output signal indicative thereof, a second sensor for sensing the position of said cover structure on said receptacle and providing an output signal indicating that said receptacle is closed, heater means and a temperature sensor disposed for sensing a change in temperature of the sample in said receptacle, a port in a wall of said chamber, said port being aligned with said sample support structure and permitting introduction and removal therethrough of a sample from the receptacle of said sample support structure, and a sealing structure adapted to seal said port, said sealing structure includes coupling structure for detachable connection to a sample container for inserting said sample container through said port for positioning in said receptacle with said sealing structure concurrently sealing said port.

3. The apparatus as claimed in claim 2 and further including frame structure in said chamber wherein said sample support structure is supported on and is pluggably removable from said frame structure for removal from said chamber through its port.

4. Microcalorimetry apparatus comprising structure defining a chamber, thermal insulation enclosing said chamber, means to control the temperature of said chamber, a sample support structure in said chamber, said sample support structure including a thermally insulated receptacle for receiving a sample to be analyzed, a cover structure for closing said receptacle, a first sensor for sensing a sample container disposed in said receptacle and providing an output signal indicative thereof, a second sensor for sensing the position of said cover structure on said receptacle and providing an output signal indicating that said receptacle is closed, heater means, a temperature sensor disposed for sensing a change of temperature of the sample in said receptacle, and a thermal coupling member disposed in said receptacle, said thermal coupling member having a flexible wall adapted to conform to an outer surface of a sample container disposed in said receptacle, said thermal coupling member being in contact with said heater means and said temperature sensor for transmitting heat between said heater means and a sample container in said receptacle and said sample container and said temperature sensor.

5. For use in microcalorimetry apparatus having structure defining a chamber, thermal insulation enclosing said chamber, at least a portion of said thermal insulation being porous, means to supply gas for flow along a gas flow path to said chamber to maintain a positive pressure in said chamber sufficient to cause continuous flow of gas through said porous insulation, means to control the temperature of gas supplied to said chamber, and a plurality of sample support structures in said chamber, each said sample support structure including a thermally insulated receptacle for receiving a sample container, heater means for supplying heat to said receptacle, a temperature sensor for sensing a change in temperature of material in the sample container in said receptacle and a container sensor for sensing the presence of a sample container in said receptacle, a sample container having a body portion of predetermined dimension conforming to the principal dimension of said receptacle and a surface projecting beyond said body portion for actuating said container sensor when said sample container is inserted in said receptacle.

6. The apparatus as claimed in claim 5 wherein each said sample support structure further includes a cover and said receptacle includes a cover sensor for sensing the position of said cover structure on said receptacle and providing an output signal indicating that said receptacle is closed.

7. Microcalorimetry apparatus comprising structure defining a chamber, thermal insulation enclosing said chamber, a plurality of sample support structures in said chamber, each said sample support structure including a thermally insulated receptacle for receiving a sample to be analyzed, heater means in said receptacle for supplying heat to said receptacle, a temperature sensor disposed for sensing a change of the sample in said receptacle, and a thermal coupling member having a flexible wall adapted to conform to the outer surface of a sample container in said receptacle for transferring heat between said heater means and the sample container and between said sample container and said temperature sensor, one wall of said chamber having a plurality of spaced ports therein, each said port being aligned with a corresponding sample support structure and permitting introduction and removal therethrough of a sample from the receptacle of the corresponding sample support structure, and a plurality of sample container handling structures, each said sample container handling structure including sealing structure for sealing a port in said wall and coupling structure for detachable connection to a sample container for inserting said sample container through said port for positioning in said receptacle with said sealing structure concurrently sealing said port.

8. The apparatus as claimed in claim 7 wherein each said sample container handling structure further includes cover structure for closing said receptacle and said coupling structure depends from said cover structure.

9. The apparatus as claimed in claim 7 and further including a sample container having a projecting flange portion and wherein said coupling structure includes a plurality of spring fingers for latching engagement with the flange portion of said container so that said sample container may move axially relative to said coupling structure.

10. The apparatus as claimed in claim 9 wherein each said sample container handling structure further includes cover structure for closing said receptacle and a linkage connecting said cover structure and said sealing structure, said linkage permitting said cover structure to move axially relative to said sealing structure.

11. The appratus as claimed in claim 9 wherein each said sample support structure includes a smooth inner surface of plastic material and a first sensor projecting inwardly beyond said inner surface for sensing a sample container disposed in its receptacle and providing an output signal indicative thereof and each said sample container includes a body portion of predetermined cylindrical configuration and a radially projecting cylindrical surface above said body portion for actuating said first sensor.

12. Microcalorimetry apparatus comprising structure defining a chamber, thermal insulation enclosing said chamber, a plurality of sample support structures in said chamber, each said sample support structure including a thermally insulated receptacle for receiving a sample to be analyzed, a first sensor for sensing a sample container disposed in its receptacle and providing an output signal indicative thereof, heater means and a temperature sensor disposed for sensing a change in temperature of the sample in said receptacle, one wall of said chamber having a plurality of spaced ports therein, each said port being aligned with a corresponding sample support structure and permitting introduction and removal there through of a sample from the receptacle of the corresponding sample support structure, and a plurality of sample container handling structures, each said sample container handling structure including cover structure for closing said receptacle, sealing structure for sealing a port in said wall, coupling structure depending from said cover structure for detachable connection to a sample container for inserting said sample container through said port for positioning in said receptacle with said sealing structure concurrently sealing said port, and a second sensor for sensing the position of said cover structure on said receptacle and providing an output signal indicating that said receptacle is closed.

13. The apparatus as claimed in claim 12 and further including a sample container including a body portion of predetermined dimension and a surface projecting radially beyond said body portion for actuating said first sensor.

14. The apparatus as claimed in claim 13 and further including a thermal coupling member in said receptacle adjacent said heater means and said temperature sensor for transmitting heat between said heater means and a container in said receptacle and said container and said temperature sensor, said thermal coupling member including a container having two opposed flexible wall members and a hydrocarbon thermal coupling fluid between said wall members.

15. The apparatus as claimed in claim 14 and further including frame structure in said chamber wherein each said sample support structure is supported on and is pluggably removable from said frame structure for removal from said chamber through its corresponding port.

16. Microcalorimetry apparatus comprising structure defining a chamber, thermal insulation enclosing said chamber, a plurality of sample support structures in said chamber, each said sample support structure including a thermally insulated receptacle for receiving a sample to be analyzed, a first sensor for sensing a sample container disposed in its receptacle and providing an output signal indicative thereof, heater means and a temperature sensor disposed for sensing a change in temperature of the sample in said receptacle, one wall of said chamber having a plurality of spaced ports therein, each said port being aligned with a corresponding sample support structure and permitting introduction and removal therethrough of a sample from the receptacle of the corresponding sample support structure, and a plurality of sample container handling structures, each said sample container handling structure including sealing structure for sealing a port in said wall and coupling structure for detachable connection to a sample container for inserting said sample container through said port for positioning in said receptacle with said sealing structure con currently sealing said port, each said sample container including a body portion of predetermined dimension and a radially projecting surface above said body portion for actuating said first sensor.

* * * * *

UNITED STATES PATENT OFFICE
CERTIFICATE OF CORRECTION

Patent No. 3,789,662         Dated February 5, 1974

Inventor(s) John F. Zettler et al.

It is certified that error appears in the above-identified patent and that said Letters Patent are hereby corrected as shown below:

Column 8, line 31, the numeral "9" should be --7--.

Signed and sealed this 14th day of May 1974.

(SEAL)
Attest:

EDWARD M. FLETCHER, JR.
Attesting Officer

C. MARSHALL DANN
Commissioner of Patents